United States Patent [19]

Bory et al.

[11] 4,133,754

[45] * Jan. 9, 1979

[54] WATER PURIFICATION DEVICE

[75] Inventors: Barbara H. Bory, Fort Lee; Alan B. Kessler, Ramsey, both of N.J.

[73] Assignee: Lever Brothers Company, New York, N.Y.

[*] Notice: The portion of the term of this patent subsequent to Feb. 8, 1994, has been disclaimed.

[21] Appl. No.: 805,751

[22] Filed: Jun. 13, 1977

Related U.S. Application Data

[63] Continuation-in-part of Ser. No. 728,375, Sep. 30, 1976, Pat. No. 4,039,444.

[51] Int. Cl.$^2$ .............................................. B01D 15/00
[52] U.S. Cl. ........................................ 210/36; 210/40; 210/282; 210/506; 252/176; 252/427; 252/428
[58] Field of Search ............... 210/36, 39, 40, 59, 210/64, 263, 282, 502, 506, 504, 508, 267; 252/175, 176, 181, 427, 428, 444, 445; 426/77-84

[56] References Cited

U.S. PATENT DOCUMENTS

| | | | |
|---|---|---|---|
| 1,162,244 | 11/1915 | Kitsee | 252/428 |
| 2,214,925 | 9/1940 | Gutrie | 210/282 |
| 3,183,096 | 5/1965 | Hiscock | 426/84 |
| 3,327,859 | 6/1967 | Pall | 210/282 |
| 4,039,444 | 8/1977 | Bory et al. | 210/282 |

FOREIGN PATENT DOCUMENTS 2362860 6/1975 Fed. Rep. of Germany ........... 210/282

Primary Examiner—Charles N. Hart
Assistant Examiner—Benoit Castel
Attorney, Agent, or Firm—Michael J. Kelly; James J. Farrell; Melvin H. Kurtz

[57] ABSTRACT

A device for the purification of water and methods for the use thereof are disclosed. The device comprises a closed container substantially porous to water, a purification agent contained therein and an ingredient dispersed in the purification agent for the purpose of inhibiting fine particles of the agent from escaping the container when the device is immersed in water. The disclosed inhibitory ingredients include certain modified starches, wood flour and aluminium lanolate soap.

The device is especially useful in removing incipient impurities from drinking water that can elude customary water treatment and render drinking water organoleptically unsatisfactory.

19 Claims, No Drawings

WATER PURIFICATION DEVICE

This application is a Continuation-In-Part application of copending application Ser. No. 728,375, filed Sept. 30, 1976 Ser. No. 728,375 has issued as U.S. Pat. No. 4,039,444 on Aug. 2, 1977.

BACKGROUND OF THE INVENTION

1. Field Of The Invention

This invention relates to an improved device for the purification of drinking water and methods for using the same. The improvement in the device comprises the addition of certain inhibitors to the purification agent contained in the device to substantially inhibit the migration of the fine particles of the purification agent through the porous member of the container. The primary intended use of the device is for the treatment of tap water or other similar sources of drinking water to substantially remove impurities that may have eluded conventional water treatment practices. The effect of these impurities, depending upon an individual's discriminatory ability, detract from the organoleptic acceptability of the water, and in some cases may present a potential risk to health.

Water intended for human consumption is usually derived from sources that have been exposed to various sources of human and industrial wastes and is therefor treated to render it fit for human consumption prior to its being piped into the home. Generally, water that reaches the treatment plant is treated with chlorine to control bacteria. Sediment in the water, mud, other solids, sewage, etc., that is heavy enough to settle to the bottom of the sediment basins, does so. Numerous chemicals are added to the water to encourage small particles to clump together, adjust the pH, control odor and further inhibit bacteria build-up. Despite this processing, some of the impurities and toxic materials are never removed from the water before reaching the consumer. In fact, the chlorination treatment itself is suspected of further contributing to the problem by the chlorination of organics in the water to form halocarbons.

While it is well known that further treatment of the water with granular activated carbon has the ability to remove many of the objectionable materials, many towns and even some major cities find such further treatment too expensive.

2. State Of The Art

Persons sensitized to this problem have generally had two options open to them. The simplest, but perhaps the most costly to the individual choosing this option, is the purchase of bottled "pure water" from various sources. Unfortunately, these waters are marketed at a rather substantial price considering the price of most municipally supplied waters. The second alternative is the installation of complicated and costly devices to condition the water once it reaches the home. Unfortunately in many cases, these devices overcondition the water and remove essential minerals needed in key body process; moreover, they require significant maintenance. Various devices have been disclosed for treating water with ion exchange resins or other deionizing substances.

Edelstine, U.S. Pat. No. 1,504,329 discloses an apparatus for base exchanging substances and relates to water softeners of the base exchanging silicate class and to methods of using them. This patent does not contemplate the use of granular activated carbon nor does it direct itself to the inhibition of migration of particulate matter from the described device. Gudmundsen, U.S. Pat. No. 2,202,001, discloses another water softener device and consists of a porous spherical cloth bag containing a base exchanging material and having an opening for the addition of the water to be treated. The water, once treated, exits the bag by passing through the porous side walls of the bag. Nothing disclosed concerning the inhibition of migration of particulate matter through the aforementioned side walls. Eweson, U.S. Pat. No. 2,335,657 discloses a hand operated water softening apparatus employing zeolite or other granular materials for softening small batches of water. Ellison, U.S. Pat. No. 2,759,307 discloses a unit for treating water to remove undesirable ions consisting of an ion exchange substance contained within a porous container. Wade, U.S. Pat. No. 3,224,586, discloses a bag assemblage usable for removing impurities from a given quantity of liquid, and is especially directed to the problem of removing radioactive isotopes from water using ion exchange resins. The foregoing devices, however, do not contemplate the use of activated carbon nor do they address themselves to the inhibition of particulate migration.

Additionally, various devices have been disclosed for treating water with either granular active carbon or granular activated charcoal as it is variously known. For Example, Young, U.S. Pat. No. 1,208,882, relates to improvements in canvas domestic water bags consisting of a device fitted to the bag and consisting of a container to hold charcoal wherein the charcoal is held in the container by a sponge or other suitable porous stopper-like closure. Rabjon, U.S. Pat. No. 2,435,510, discloses a filter cartridge for purifying ordinary hydrant water for drinking purposes. Simpson, et al., U.S. Pat. No. 2,633,990, discloses a cartridge filtration device using activated carbon or a diatomiaceous earth pretreated with gaseous chlorine or other sterilizing agent. Sanzenbacher, U.S. Pat. No. 3,392,837, discloses another water conditioning unit employing activated charcoal in conjunction with other substances such as silver and water softening additives for the ultimate purification of the water.

A major problem associated with porous devices using particulate matter for purifying the water is the migration of the particulate matter from the device either along with or into the purified water. Several attempts have been made to reduce this problem. Gudmundsen, U.S. Pat. No. 2,117,091, sets forth the use of fine grain zeolite and the prevention of fines migration by the use of a closed woven fabric through which fluid may pass and at the same time retain the exchanging particles. Dunn, et al., U.S. Pat. No. 3,225,932 employes a protective shield comprising an arrangement of a perforated or woven fabric bag with an outlet tube to form a tight seal for preventing the escape of particulate carbon. Teeple et al., U.S. Pat. No. 3,715,035, discloses a high capacity portable water purifier employing a sediment trap that will filter out particulate matter including the active charcoal and deionizing resin utilized in the device.

The foregoing approaches deal primarily with modification of the porous element of the device in order to prevent passage of particulate matter. By contrast, Andrus, U.S. Pat. No. 2,072,976 suggests a device employing water soluble chemicals which are intended to escape the device and to react with each other or with soluble impurities to form a coagulum. The coagulum containing the impurities is then allowed to settle out of the water or the water is filtered to separate the same. This has the disadvantage, however, of requiring further filtration and separation.

While various solutions of water purification problem have been proposed, they have many disadvantages, among them being overtreatment of the water (i.e., removal of necessary metallic ions), use of cumbersome and expensive devices, and the inability to prevent the fine particles of the purification agent from entering the water during and after treatment.

The present invention now affords a novel means for the prevention of fine particles of the treatment agents from migrating through a container fabricated for the purpose of purifying drinking water. Additionally, this invention now allows for the easy and inexpensive treatment of drinking water to remove certain impurities that adversely affect their organoleptic acceptability.

SUMMARY OF THE INVENTION

An object of the present invention is the prevention of the migration of particulate water purification treatment agents through a container, fabricated at least in part from substantially porous paper, or non-woven fabric when said container is immersed in water.

A further object of the invention is to accomplish the prevention of the migration of the fine particles without substantially affecting the porosity of the paper used in the container construction.

A still further object of the invention is to prevent the migration of the fine particles by the use of certain agents which themselves will not significantly adversely affect the flavor or taste of the water to which the device is applied.

An even further object of the invention is the prevention of a water purification device made of closed, porous, non-woven fabric container containing granular activated carbon as the water purification agent wherein the fine particles of the carbon are prevented from migrating through the container when the device is immersed in water.

Various water purification devices of simple and inexpensive construction can be fabricated using substantially porous, high strength paper or non-woven fabric to allow contact between the untreated water and the treating agent. Applicants have found that one of the most desirable designs can be fabricated in the form of an ordinary teabag with the exception that granular activated carbon or some other suitable water treatment agent, or combination thereof are substituted for the dried tea leaves customarily found therein. This design is particularly desirable in that it can be easily and inexpensively fabricated on existing machines available for teabag manufacture.

Unfortunately, however, it was discovered that small particles of the water purifying or treatment agent, hereinafter referred to as "fines", and in particular fines associated with granular activated carbon, have the tendency to migrate through the porous paper and enter into the treated water. While these fines presented little or no danger to the user and did not contribute to any off flavor of the water, the presence of these fines in the treated water is unsightly and therefore unacceptable from a consumer standpoint of view.

THE BASIC DISCLOSURE

As a solution to this problem, and as set forth in the parent application, Applicants discovered a device for purifying or treating water, which, broadly stated, comprises the following basic elements: a closed container, wherein at least one functional surface of said container is fabricated from a high tensil strength porous paper; an amount, sufficient to treat said water of a water purifying agent(s); and an inhibiting agent(s) dispersed therein for preventing the fines of said water purifying or treatment agent(s) from escaping or migrating through the closed porous container when the apparatus is brought into contact with the water to be treated. The net effect offered by the invention is that the particulate matter or fines remaining in an otherwise organoleptically and palletable water treated by the device are substantially reduced. The aggregation of fines residue is thereby avoided in the drinking water.

The foregoing discovery was based on the fact that applicants had found that certain chemically unrelated substances could be dispersed or mixed in with the purifying or treating agent, and in particular granular activated carbon, for preventing the fines of these agents from migrating through the porous container when contacted with water. It was also discovered that these inhibitor ingredients or agents would not substantially contribute any adverse flavor of their own to the treated water. These ingredients include certain mildly inhibited amylose-containing starches, wood flour and a substantially pure aluminum lanolate. Hereinafter, these ingredients will be collectively referred to as "inhibitors" or "inhibiting agents."

As set forth in the parent application, the mechanism by which these inhibitors work to prevent the migration of the fines is not precisely known. While not desiring to be bound by the following phenomena, Applicants' theorized that the physical characteristics displayed by these inhibitors, such as their surface characteristics, tackiness, and swelling properties, may aid in the prevention of this migration through the porous paper into the surrounding water. it is significant to note, as pointed out in the parent application, that not all substances recognized for their swelling properties or tackiness will be operable for the purposes of this invention. Certain factors, such as compatibility of the inhibitors with the particle size distribution of the treatment agent, is critical under certain conditions. Generally, it was disclosed this type of compatibility must be empirically determined. In addition, the rate of swelling may contribute to the functionality of the water purifier according to the invention depending on the particular conditions of application. Moreover, as previously disclosed, all known starches, modified or otherwise, will not be functional with this device, nor will all wood cellulosics or insoluble soaps be operable. For the purpose of this invention, therefore, the class of compounds embraced by the term "inhibitors" or "inhibiting agents" is meant to include those compounds that will inhibit the aforementioned migration without adversely affecting the intended treatment of the water.

While the teabag device was found to be the most desirable from a commercial standpoint, countless variations are available in which at least part of the device can be fabricated from a substantially porous, high strength paper similar to that customarily used for teabags. This would include cartridges for filtration equipment wherein the aforementioned highly porous paper is fabricated in such a way to enable its surface to retain the active material as well as allow passage of the water from within.

For the purpose of convenience and clarity, each of the aforementioned elements forming the apparatus and improvement was described in detail in the parent application as follows:

THE CONTAINER

Generally and broadly stated, the container of the parent application, essentially had at least one functional surface substantially constructed of a porous, relatively high wet and dry tensile strength paper which enabled the water to be treated to come into contact with the enclosed agent. While various other parts of the container may be fabricated from other materials of a varying porosity or non-porous paper, glass, metal, and combinations thereof, the containers preferably contemplated by the invention were constructed of a substantially porous high strength paper capable of withstanding sheers encountered when coming into contact with water. The types of devices that were subject to the invention were devices wherein porous paper was used as an integral part of the construction, for example, a window to allow water to contact the treatment agent contained in the device. Such a device could be, for example, a plastic cylinder having at least one end closure made from the porous paper. Also contemplated were devices where the porous paper acts as a filter or is part of a removable filber cartridge not part of the permanent elements of the device. This included, for example, a device comprising a rigid or semi-rigid container, an operably removable cartridge contained in the container to hold the treatment active, wherein said cartridge is constructed, at least in part, from the porous paper. Additionally, it was disclosed that countless other variations in design and construction would be employed to accomodate the introduction of the inhibiting agents according to the invention to prevent the migration of particulate fines into the water to be treated.

A more narrow aspect of the disclosed invention contemplated the teabag type of construction for containing the purifying agent since it offered the simplest and most economical means of fabrication. A teabag is a container substantially constructed from a porous paper wherein the container is a closed bag having at least on compartment. A better understanding of the many designs, and variations in assembly can be obtained by referring to the standard works and publications concerning the art of teabag manufacture and design including the following references which are incorporated herein by reference: "A Look At The Latest In Teabag Technology", *World Coffee And Tea,* Volume 16, No. 9, page 32 et. seq., 1976; Bulletin No. 27, Rotorex Tea Machines, distributed by Rockwell Pneumatic Scale Limited, Welshharp, Edgeware Road, London N.W. 2; Hischron, U.S. Pat. No. 2,671,026,issued Mar. 2, 1954; British Pat. No. 1,164,481 to *Ima Societa Perazioni,* an Italian corporation, issued Sept. 17, 1969; British Pat. No. 1,022,021, to Desmond Walter Molins et al., issued Mar. 9, 1966.

As previously disclosed, the material that froms the basis of a teabag type container is a specifically defined substantially porous paper that will allow the water being treated to come into intimate contact with the particulate treating agent. In addition to being substantially porous, this paper also should possess a relatively high wet and dry strength sufficient to enfold and retain the contents thereof. These papers generally have a high concentration of hemp fiber in combination with the alpha-cellulosic fiber (the material employed in most paper). These papers are generally characterized by having a thickness of about 0.001 to 0.005 inches, a machine direction (MD) dry tensile strength of at least 2,000 grams per inch, and a cross direction (CD) dry tensile strength of at least about 800 grams per inch. The same paper should have a minimum porosity of at least 100 cubic feet of air per minute per square foot of surface area (cfm/ft$^2$) as measured on a Gurley Permeometer at a back pressure ($\Delta P$) of $\frac{1}{2}$ inch of water. Additionally, the same paper should have an MD wet tensile strength of about at least 450 grams per inch and a CD wet tensile of about at least 175 grams per inch.

More desirably, it was disclosed that the paper has a MD dry tensile strength of at least 2,000 grams per inch, a CD dry tensile strength of at least about 850 grams per inch, a porosity of at least 300 (cfm/ft$^2$) a MD wet tensile strength of about 500 grams per inch, and a CD wet tensile strength of about 200 grams per inch. This paper has the added benefit of greater porosity. In a preferred mode, it was disclosed that the paper should have a porosity of about 550 cfm/ft$^2$ to about 650 cfm/ft$^2$. The same paper should have an MD and CD dry tensile strengths of at least about 2,500 grams per inch and 900 grams per inch respectively and an MD and CD wet tensile strengths of at least about 550 grams per inch and 200 grams per ich respectively, and is further characterized by having a gauge of about 2.2 to 2.5 mils. The desired paper of the preferred mode exhibits very high porosity in combination with excellent strength characteristics. In general, any grade of paper used for commercial teabags will come within the above limitations and will be adaptable according to the invention herein. It was further disclosed that attributes or properties of the paper that while not critical to the invention but which may be advantageous to the fabrication of the bag include, but are not limited to, coatings and other impregnations in the paper to render it self-sealing or enable it to be closed by heating or ultrasonic means.

Various closure means of the container of the preferred mode disclosed included but were not limited to sewing, gluing, stapling, heat sealing, and combinations thereof. In fact, it was disclosed that the means by which the container is closed or sealed is in no way limiting as long as the seal is sufficient to keep the container closed while in use. Additionally, it was set forth that appendages could be incorporated in the container to facilitate its use. These included, but were not limited to various wands, strings, strips of plastic, tabs, hooks, or other fastening means that would facilitate immersion and/or retrieval of the device into or from the liquid being treated. Again, as previously being stated, infinte variation of the construction can easily be performed by one skilled in the art. It is one such variation that is the subject matter of the instant C-I-P Application and that will be discussed in detail.

THE WATER TREATMENT AGENT

The water treatment or purifying agents encompassed and subject to the parent invention as well as the present invention are without limit with respect to the purification function the agent performs; however, the class of agents is restricted to those compounds, in the form they are employed that would, without the presence of the inhibitor of the present invention exhibit fines migration through the porous paper or non-woven fabric portion of the device when the device is immersed or contacted with water, Thus, any of the well known purification agents, including but not limited to such things as adsorption agents, such as ion exchange resins, various silicas and silicates and the like, or combinations thereof may be used in accordance with the instant invention provided that their use without the additional incorporation of the inhibitory agent would result in their migration through the paper or nonwoven fabric portion of the device when the device is immersed in water.

In one of the previously disclosed commerical modes, granular activated carbon is employed as the purification agent due to its several unique abilities including, but not limited to, the lack of its effect on essential minerals contained in the water.

As disclosed, activated carbon has long been known for its adsorptive qualities and is a unique and effective agent for purification, isolation, and recovery of trace materials. Much of the adsorptive action of the active carbons or active charcoals, as they are variously known, can be explained in terms of the attractive forces exerted by the enormous surface area. However, there is evidence that both physical and chemical adsorption may occur simultaneously. Since active carbons are not 100 percent pure carbon but contain measurable quantities of chemically bound oxygen, hydrogen and other elements, it is theorized in the art that the presence of chemical groupings resulting therefrom such as, for example, carboxyl, carbonyl, hydroxyl, or mixtures thereof at or near the surface of the pores account for a limited ion exchange affect.

The adsorptive properties of these carbons are graded in the carbon industry using one or more of the following indexes:
1. Adsorption of iodine
2. Adsorption of color from black strap molasses solution
3. Adsorption of phenol
4. Sorptivity index (S.I.)

The phenol value (number 3 above) is generally the index relied upon for the evaluation of carbons to be used in water purification. With the exception of the phenol value, a higher numerical value for a particular index indicates greater activity.

As shown in the parent application, a wide variety of commerically available granular activated carbons have application in the instant invention. While any grade will produce substantially satisfactory results with respect to water purification, it has been shown that extremely coarse (particle size) grades produce greater amounts of fines and require greater amounts of inhibitor to be employed. This has also been found to be true when extremely fine grades are employed, In certain previously disclosed applications of the invention where a conventional "single service" teabag type container is employed, it was shown that the use of large amounts of inhibitor may restrict the amount of carbon that can be employed, and therefor when such smaller devices are used, it is desirable to employ carbons having particle size that would prevent migrtion where the inhibitory agent is present at a level of no more than 50 percent of the contents contained in the device.

In general, it was disclosed that while grades having a size distribution of about 3 to about 5mm could be successfully inhibited, they can require very large amounts of inhibitor. Generally, grades having a particle size of about 0.25to about 1.0 mm were disclosed to be preferred. The more preferred size range disclosed was about 0.35 to about 0.50 mm. More desirably, the particle size of the carbon was disclosed as being further characterized by a typical screen size ranged of about:

| | | |
|---|---|---|
| | on 20 mesh | 10 percent maximum |
| through 20 mesh | on 30 mesh | 25 to 65 percent |
| through 30 mesh | on 40 mesh | 20 to 40 percent |
| through 40 mesh | on 50 mesh | 5 to 20 percent |
| through 50 mesh | | 3 percent maximum |

This desirable carbon was disclosed as being further characterized by a Phenol Number of about 135 mg/g dry carbon, an iodine Number of about 900 mg/g dry carbon, and an apparent density of about 0.50 to 0.55 grams per ml (dry).

While the above constitutes the disclosed perferred mode, it included, but was not limited to various other distributions of particle sizes including those characterized by distribution of particles having no more than 10 percent of the particles being larger than 14 mesh and no more than 10 percent being smaller than 60 mesh.

Finally, it was disclosed that while grades having a particle screen size of about 1 mm to about 3 mm may be inhibited successfully, these grades may not be desirable in certain commercial applications due to the large amounts of inhibitor that may have to be employed.

THE INHIBITORY INGREDIENTS

In the parent application, Applicants disclosed that they had discovered that various and relatively unrelated substances when added or dispersed in the water treatment agents had the ability to inhibit the migration of the fines of such agents through the porous paper of the device. In particular, various and relatively unrelated substances when added to granular activated carbon were found to inhibit the migration of the fines of said carbon through the porous paper used in fabricating the orginally disclosed container when that container was immersed in water. Additionally, it was disclosed that these substances exhibit minimum critical ratios for effectiveness as determined by the particle size distribution of the carbon being employed and upon the physical dimensions of the device itself.

These ingredients included certain mildly inhibited amylose containing starches, wood flour, and an aluminum lanolate soap.

With respect to the starch-type compounds, through experimentation, it was discovered that certain mildly inhibited amylose containing starches when combined with the activated carbon would inhibit the fines migration. By "inhibited starch" is meant a starch that has been cross-linked, in this case using epichlorohydrin, thereby modifying the starch's swelling characteristics. By being mildly inhibited, is meant starches having a degree of cross-linking such that the granule swelling power (GSP) of the resulting cross-linked starch has a value of about 8 to 32.

Granule swelling power is a measure of the extent of starch inhibition and is defined as the amount of swollen hydrate paste which is formed by the cooking in water of one gram of dry starch divided by the weight of anhydrous starch in the swollen paste. The GSP value is determined by dispersing one gram of starch (anhydrous weight) in a sufficient amount of distilled water to give a total weight of 100 grams. Normally, the starch is suspended in the water and is stirred over a boiling water bath for 4 minutes and is then covered for the remainder of the cooking cycle. After cooking is complete, the sample is readjusted to a weight of 100 grams with water and transferred quantitatively into a graduated 100 ml centrifuge cup. The sample is then centrifuged at about 2,000 rpm for exactly 20 minutes and the starch dispersion is removed as a clear supernate and compacted swollen paste. The percent solids in the supernate is determined by evaporating off an alliquot of the sample. The weight of the swollen paste is determined directly after the decantation of the supernate and the amount of dry solids in the paste is determined by evaporation. The granule swelling power is then calculated by the following formula:

$$GSP = \frac{\text{Wet Weight of Swollen Paste}}{\text{Weight of Dry Starch In Swollen Paste}}$$

Unconverted starch will ordinarily exhibit a higher granule swelling power than cross-linked, i.e., inhibited starches. Thus raw corn starches usually have a GSP value of about 33 to about 35. Mildly inhibited starches usually have a GSP value of about 8 to 32. In some cases and depending on the cooking characteristics of the particular starch being tested, some variation in the cooking time will have to be made to ensure that the starch can be centrifuged quantitatively. Thus it is important to indicate the actual cooking time in characterizing the starch tested. All time as will be referred to hereinafter are for total cooking time.

with respect to the parent application, it was disclosed that a pregelatinized pH modified epichlorohydrin cross-linked tapioca starch having a gross swelling power (GSP) of about 16 (measured after about 30 minutes of cooking in boiling water), a pH of about 6, and a predominant mesh size of about 20 to 100 mesh, and a pH modified epichlorohydrin cross-linked corn starch having a gross swelling power of about 13 (measured after about 45 minutes of cooking in boiling water), a pH of about 6, and a predominant mesh size of about 12 to 100 mesh have been found to inhibit several grades of carbon. While these particular starches are preferred, any similar starch having a GSP value of about 8 to 32 will be suitable. However, starches having a GSP of about 8 to 20 will produce the best results.

In addition, it was disclosed that Applicants had discovered that wood flour will act as an inhibitor when it is mechanically mixed with the granular activated carbon. Wood flour is essentially sawdust and consists of fine free-flowing, very coarse particles of wood, free from dirt, bark, and other similar foreign matter. Generally, about 100 percent of the particles should be able to pass (U.S. Standard Sieve Size) of about 30 mesh while only about 6 to 10 percent should be able to pass through a 100 mesh screen. In the preferred mode, a mixture of about 90 percent birch with about 10 percent beech and/or maple can be used. Variation of the composition of the wood is fairly permissible so long as the wood will not impart a woody flavor to the water. The preferred wood flour is further characterized by having a water content of about 3 to 5 percent as measured by a 3-hour evaporation loss at 105° C, a maximum acid value of about 1, a pH (in about a 2 percent solution of water) of about 5, a diethyl ether extractable residue of no greater than about 2.5 percent, and an acetone extractable residue of no greater than about 4 percent. A wood flour suitable in the previously disclosed invention and as will be seen in the instant invention is sold by Wilner Woods Products Company as their grade B-610.

Additionally, it was disclosed that a granular aluminum lanolate soap produce from distilled lanolic fatty acids when mechanically mixed with the granular activated carbon would also act as an effective inhibitor according to the invention. This product is in the form of free-flowing particles having a predominant mesh size of about 40 mesh. A suitable material falling within this description was available commercially from the Croda Corporation under the trademark name "Skiralan".

Significantly it was disclosed that while each of the aforementioned inhibitors would inhibit carbon fines from passing through the porous paper when the device is immersed in water, not all inhibitors would work for all grades of carbon. This is especially true when limitations are placed on the size of the device actually being employed.

Generally, and equally applicable to the parent disclosure as well as the instant disclosure most common teabag constructions, that is to say "single service" sized bags, contain a volume of about 0.5 to 1.5 cubic inches. In such cases, the amount of carbon that can be contained within that volume becomes critical in order to have a sufficient amount of carbon present to purify a reasonable amount of water within a reasonable amount of time. In such cases, the ratio of starch or other inhibitor to the carbon is critical in order to allow a sufficient amount of carbon to be placed within the confines of the bag.

In situations where the size of the container is unlimited, any number of variations in the combination of carbon and inhibitor can be made to accomodate the invention.

When the size of the device is limited, for example, in the embodiment employing a "single service" type teabag design, it is desirable to have an inhibitor to carbon ratio of no greater than 1:1. Preferably, an inhibitor to carbon ratio in at least 1:2 is suitable when using a device having a volume of about 0.5 to 1.5 cubic inches. Such a ratio will enable the inclusion of a sufficient amount of the activated carbon in a device of this size to treat approximately one gallon of water within about a 24-hour treatment period. Desirably, 3 grams is about the amount of carbon used. Variations in the amount of carbon and treatment period are infinitely variable, and if one is not concerned with the actual size of the device or duration of treatment, almost unlimited variations are available.

Many considerations must be made in determining the actual treatment any specific water may require. While the activated carbons have the ability to adsorb many times their weight in impurities, the usual mode of treatment, i.e., merely hanging the device in the water to be treated, does not provide for much circulation of the water through the device. In situations wherein the amount of impurities were not extremely high either significantly smaller amounts of carbon or shorter treatment times could achieve adequate results. Thus should one desire to fabricate a device for a lower level of contamination in the water, reduced levels or times of treatment can be employed.

With respect to the aforementioned "single service" sized teabag type container having a volume of about 0.5 to 1.5 cubic inches, and fabricated from the porous paper disclosed in the parent application, the following critical ratios were observed and were disclosed in that application:

A. In situations where the granular activated carbon has a particle size distribution where no more than 5 percent of the particles are larger than about 4 mesh and no more than 5 percent of the particles are smaller than about 14 mesh, the inhibitor should be the previously mentioned corn starch having a gross swelling power of about 13. Using this ingredient enables a weight ratio of at least 1:2 starch to carbon to be employed with adequate results.

B. In the situations where the granular activated carbon has a particle size distribution, wherein no more than 10 percent of the particles are larger than about 14 mesh and not more than 10 percent of the particles are smaller than about 60 mesh, the corn starch previously described can be used. In this situation, however, a weight ratio of at least 1:1 must be used to achieve satisfactory results.

C. When the granulated activated carbon has a particle size distribution where no more than 10 percent are larger than about 20 mesh and no more than 3 percent are smaller than about 50 mesh, the pregelatinized tapioca starch having a GSP value of about 16 as previously described should be employed. Using this ingredient enables a weight ratio of at least 1:2 starch to carbon to be employed with adequate results.

D. In the situations where the granular activated carbon has a particle size distribution wherein no more than 5 percent of said particles are larger than about 12 mesh and no more than 5 percent of said particles are smaller than about 40 mesh, the pregelatinized tapioca starch can be employed. In this particular instance, however, weight ratios of at least 1:1 starch to carbon must be employed to achieve satisfactory results.

E. in situations where the granular activated carbon has a particle size distribution wherein no more than 10 percent of the particles are larger than about 20 mesh and no more than 10 percent of the particles are larger than about 50 mesh, the aluminum lanolate soap, in the form of free-flowing particles as previously described can be employed. Using this ingredient enables a weight ratio of as low as 1:6 soap to carbon to be employed.

F. In situations where the granular activated carbon has a particle size distribution wherein no more than 10 percent of the particles are larger than about 20 mesh and no more than 5 percent are smaller than about 40 mesh or wherein no more than 10 percent are larger than about 14 mesh and no more than 10 percent are smaller than about 60 mesh the aluminum soap can be employed in weight ratios of at least 1:1 soap to carbon to provide adequate results.

Additionally, it was disclosed that combinations of the various inhibitors could be employed. This is particularly useful in situations where a grade of carbon is employed with a very wide particle size distribution and a single inhibitor is found to be inadequate.

Various methods of treatment can be employed and were disclosed. However, simply immersing the device or contacting it with the water for a period sufficient to remove the impurities desired, is sufficient to enable adequate treatemnt. With most water, three grams of carbon has been found to remove a significant amount of impurities after 24 hours of contact with up to about one gallon of the water.

Drastically reduced treatment times or active levels can be achieved in situations where the device can be mechanically or operatively agitated in the water being treated. This operative agitation is quite similar to the agitation associated with brewing a cup of tea.

Similarly, drastically reduced treatment times can be obtained when treatment of single servings of drinking water, its economy does enable single service use where rapid purification is desired.

Various examples illustrative of the invention were presented in the parent application and are incorporated herein by reference.

THE CONTINUING DISCLOSURE

Applicants have now discovered that in addition to the previously defined porous paper, substantially porous non-woven fabrics can be advantgeously employed as the functional surface of the previously disclosed container. In addition to being substantially porous, this paper also should posess a relatively high wet and dry strength sufficient to enfold and retain the contents thereof. These fabrics generally comprise a mixture pulp and/or cellulose with a synthetic fiber such as rayon or polyester and an acrylic binder. These constituents are generally present in roughly equal proportions. Typical of compositions by way of example and in no way limiting the scope of the instant invention include a non-woven fabric comprising:

20 percent pulp
20 percent synthetic wood pulp
30 percent rayon
30 percent heat sealable binder, and again, for example, a non-woven fabric comprising:

28 percent polyester
18 percent cellulose
27 percent acrylic binder
25 percent wood pulp The compositions are infinitely variable and many functional fabrics can be fabricated by one skilled in that art.

While the exact composition is not critical, various parameters of the resulting fabric are critical to subject the fabric to use in the present invention. Generally fabrics subject to the present invention should have a porosity from about 100 to about 800 cfm/ft$^2$ as measured at a back pressure of about ½ inch of water. This porosity is proportional to the weight of said fabric and thus said fabric should have a weight of about 150 to about 650 grains/yd$^2$. This weight range will provide a fabric with a dry machine direction grab tansile strength of at least about 3 pounds per linear inch, a dry cross direction grab tensile strength of at least about 2 pounds per linear inch, a wet machine direction grab tensile strength of at least about 1 pound per linear inch, and a wet cross direction grab tensile strength of at least about 0.75 pounds per linear inch. These grab tensile strengths will provide adequate strength for processing and integrity of the resulting container in use.

More desirably, there is provided a fabric having a weight of at least 500 grains/yd$^2$, a dry machine direction strength of at least about 10 pounds per linear inch, a dry cross direction strength of at least about 6.5 pounds per linear inch, a wet machine direction strength of at least about 3 pounds per linear inch, and a wet cross direction strength of at least about 2 pounds per linear inch. This fabric has the added benefit of greater strength.

A particularly desirable fabric is one wherein the dry and wet machine direction strengths are about 10.6 pounds/linear inch and 3.5 pounds/linear inch respectively. This fabric has a dry cross direction strength of about 6.9 pounds/linear inch. This fabric can be obtained from the Chicopee Paper Company as their grade WF821.

Generally and broadly stated the instant invention is subject to the disclosure of the parent invention with respect to the container and water purification agent, the only difference being that the instant fabric is substituted for the porous paper of the parent disclosure.

With respect to the container, the container of the present invention essentially has at least one functional surface substantially constructed of the porous, relatively high wet and dry tensile strength fabric which enables the water to be treated to come into contact with the enclosed agent. While various other parts of the container may be fabricated from other materials of a varying porosity or non-porous paper, glass, metal, and combinations thereof, the containers preferably contemplated by the instant invention are constructed of a substantially porous high strength fabric capable of withstanding sheers encountered when coming into contact with water. The types of devices that were subject to the invention include devices wherein the porous fabric is used as an integral part of the construction, for example, as a window to allow water to contact the treatment agent contained in the device. Such a device could be, for example, a plastic cylinder having at least one end closure made from the porous fabric. Also contemplated are devices where the porous paper acts as a filter or is part of a removable filter cartridge not part of the permanent elements of the device. This includes, for example, a device comprising a rigid or semi-rigid container, an operably removable cartridge contained in the container to hold the treatment active, wherein said cartridge is constructed, at least in part, from the porous fabric. Countless other variations in design and construction can be employed to accommodate the introduction of the inhibiting agents according to the invention to prevent the migration of particulate fines into the water to be treated.

A more narrow aspect of the instant invention is the teabag type of construction for containing the purifying agent since it offers the simplest and most economical means of fabrications. For the purpose of the instant invention, a teabag will include a container substantially constructed from the non-woven fabric wherein the container is a closed bag having at least one compartment. A better understanding of the many designs, and variations in assembly can be obtained by referring to the standard works and publications concerning the art of teabag manufacture and design including the following references which were previously incorporated herein by reference: "A Look At The Latest In Teabag Technology"; Bulletin No. 27. Rotorex Tea Machines; Hischorn, U.S. Pat. No. 2,671,026; British Pat. No. 1,164,481 to *Ima Societa Perazioni;* British Pat. No. 1,022,021.

Attributes of properties of the fabric that while not critical to the invention but which may be advantageous to the fabrication of the bag include, but are not limited to, coatings and other impregnations in the fabric to render it self-sealing or enable it to be closed by heat of ultrasonic means.

Various closure means of the container of the preferred mode disclosed included but were not limited to sewing, gluing, stapling, heat sealing, and combinations thereof. In fact, it was disclosed that the means by which the container is closed or sealed is in no way limiting as long as the seal is sufficient to keep the container closed while in use. Additionally, appendages can be incorporated in the container to facilitate its use. These include, but are not limited to various wands, strings, strips of plastic, tabs, hooks, or other fastening means that would facilitate immersion and/or retrieval of the device into or from the liquid being treated. Infinite variations of the construction can easily be performed by one skilled in the art.

With respect to water treatment agents the present invention is subject to those agents as previously disclosed in the parent application and as previously set forth herein.

As in the parent application, Applicants have discovered that various and relatively unrelated substances when added or dispersed in the water treatment agents had the ability to inhibit the migration of the fines of such agents through the porous fabric of the device. In particular, various and relatively unrelated substances when added to granular activated carbon were found to inhibit the migration of the fines of said carbon through the porous fabric used in fabricating the container when that container was immersed in water. Additionally, it was discovered that these substances as in the parent disclosure exhibit minimum critical ratios for effectiveness as determined by the particle size distribution of the carbon being employed and upon the physical dimensions of the device itself.

These ingredients included the same certain mildly inhibited amylose containing starches, wood flour, and an aluminum lanolate soap as previously disclosed and the instant invention is subject to the same limitations with respect to these materials as previously set forth.

Significantly, as was disclosed in the case of the porous paper, while each of the aforementioned inhibitors would inhibit carbon fines from passing through the porous fabric when the device is immersed in water, not all inhibitors would work for all grades of carbon. This is especially true when limitations are placed on the size of the device actually being employed.

Generally, and equally applicable to the parent disclosure as well as the instant disclosure most common teabag constructions, that is to say "single service" sized bags, contain a volume of about 0.5 to 1.5 cubic inches. In such cases, the amount of carbon that can be contained within that volume becomes critical in order to have a sufficient amount of carbon present to purify a reasonable amount of water with a reasonable amount of time. In such cases, the ratio of starch or other inhibitor to the carbon is critical in order to allow a sufficient amount of carbon to be placed within the confines of the bag.

In situations where the size of the container is unlimited, any number of variations in the combination of carbon and inhibitor can be made to accommodate the invention.

When the size of the device is limited, for example, in the embodiment employing a "single service" type teabag design, it is desirable to have an inhibitor to carbon ratio of no greater than 1:1. Preferably, an inhibitor to carbon ratio in at least 1:2 is suitable when using a device having a volume of about 0.5 to 1.5 cubic inches. Such a ratio will enable the inclusion of a sufficient amount of the activated carbon in a device of this size to treat approximately one gallon of water within about a 24-hour treatment period. Desirably, 3 grams is about the amount of carbon used. Variations in the amount of carbon and treatment period are infinitely variable, and if one is not concerned with the actual size of the device or duration of treatment, almost unlimited variations are available.

With respect to the aforementioned "single service" sized teabag type container having a volume of about 0.5 to 1.5 cubic inches, and fabricated from the porous fabric as opposed to that fabricated from the porous paper disclosed in the parent application, the following critical ratios were observed and were disclosed in that application:

A. In situations where the granular activated carbon has a particle size distribution where: (a) more than 5 percent of the particles are larger than about 4 mesh and no more than 5 percent of the particles are smaller than about 12 mesh, or (b) no more than 10 percent of the particles are larger than about 8 mesh and no more than 10 percent of the particles are smaller than about 20mesh, or (c) no more than 10 percent of the particles are larger than about 20 mesh and no more than 3 percent of the particles are smaller than about 50 mesh, the inhibitor should be the previously mentioned corn starch having a gross swelling power of about 13. Using this ingredient enables a weight ratio of at least 1:2 starch to carbon to be employed with adequate results.

B. In the situations where the granular activated carbon has a particle size distribution, wherein no more than 5 percent of the particles are larger than about 12 mesh and not more than 5 percent of the particles are smaller than about 40 mesh, the corn starch previously described can be used. In this situation, however, a weight ratio of at least 1:1 must be used to achieve satisfactory results.

C. When the granulated activated carbon has a particle size distribution where no more than 10 percent are larger than about 20 mesh and no more than 3 percent are smaller than about 50 mesh, the pregelatinized tapioca starch having a GSP value of about 16 as previously described should be employed. Using this ingredient enables a weight ratio of at least 1:3 starch to carbon to be employed with adequate results.

D. In the situations where the granular activated carbon has a particle size distribution wherein no more than 10 percent of said particles are larger than about 14 mesh and no more than 10 percent of said particles are smaller than about 60 mesh, the pregelatinized tapioca starch can be employed. In this particular instance, however, weight ratios of at least 1:1 starch to carbon must be employed to achieve satisfactory results.

E. In situations where the granular activated carbon has a particle size distribution wherein: (a) no more than 5 percent of the particles are larger than about 4 mesh and no more than 5 percent of the particles are smaller than about 12 mesh, or (b) no more than 10 percent of the particles are larger than about 8 mesh and no more than 10 percent of the particles are smaller than about 20 mesh, or (c) no more than 5 percent of the particles are larger than about 12 mesh and no more than 5 percent of the particles are smaller than about 40 mesh, or (d) no more than 5 percent of the particles are larger than about 20 mesh and no more than 5 percent of the particles are smaller than about 40 mesh. Using this ingredient enables a weight ratio of as low as 1:3 starch to carbon to be employed.

F. In situations where the granular activated carbon has a particle size distribution wherein no more than 10 percent of the particles are larger than about 80 mesh and no more than 10 percent are smaller than about 20 mesh wood flour as previously set forth can be employed in weight ratio of at least 1:3 wood flour to carbon to provide adequate results.

Additionally, it was disclosed that combinations of the various inhibitors could be employed. This is particularly useful in situations where a grade of carbon is employed with a very wide particle size distribution and a single inhibitor is found to be inadequate.

As with the previously disclosed invention, various methods of treatment can be employed. However, simply immersing the device of contacting it with the water for a period sufficient to remove the impurities desired, is sufficient to enable adequate treatment. With most water, three grams of carbon has been found to remove a significant amount of impurities after 24 hours of contact with up to about one gallon of the water.

Many considerations must be made in determining the actual treatment any specific water may require. While the activated carbons have the ability to adsorb many times their weight in impurities, the usual mode of treatment, i.e., merely hanging the device in the water to be treated, does not provide for much circulation of the water through the device. In situations wherein the amount of impurities were not extremely high either significantly smaller amounts of carbon or shorter treatment times could achieve adequate results. Thus should one desire to fabricate a device for a lower level of contamination in the water, reduced levels or times of treatment can be employed.

Drastically reduced treatment times or active levels can be achieved in situations where the device can be mechanically or operatively agitated in the water being treated. This operative agitation is quite similar to the agitation associated with brewing a cup of tea.

Similarly, drastically reduced treatment times can be obtained with the treatment of single servings of drinking water as the economy of the device does enable single service use where rapid purification is desired.

Various examples illustrative of the invention are presented as follows and are in no way to be considered as limiting the scope of the invention which is capable of countless variations.

All parts given are by weight unless specified otherwise.

EXAMPLE I

A. Construction of Water Purification Device

Water purification devices were fabricated using commercially available heat sealing non-woven fabric. The composition of the paper comprised 20 percent pulp, 20 percent synthetic wood pulp, 30 percent rayon, and 30 percent heat sealable binder. The fabric had a weight of about 505 grains/yd$^2$. Dry machine direction and cross direction grab tensile strengths of the fabric are about 10.6 and 6.9 pounds respectively, while wet machine direction and cross direction grab tensile strengths were 3.5 and 2.5 pounds respectively. the particular grade was "WF 821" as sold by Chicopee Paper Company.

The devices were fabricated using a 2" × 4" rectangular piece of the fabric. The material was folded about its midsection to form a 2-inch folded square. The sides adjacent to the fold were then heat sealed, resulting in a pouch of a volume of about one cubic inch open at one end. These pounches were then filled with the combinations of inhibitor and carbon disclosed in sections B, C, D, and E of this example. Once these materials were loaded into the pouch, the remaining open end of the pouch was itself heat-sealed concurrent with the insertion of a piece of cord into that particular heat seal resulting in an appendage extending from the device to enable the device to be suspended in the water to be treated.

It should be noted that the fabric employed in this example was one of several commercial fabrics available. Since these fabrics are sold in a broad spectrum of grades, some variation must be expected in extrapolating these results to other grades of fabric. Thus, there may be some variation within the minimum critical limit of inhibition to treatment agent; however, these are determinable with simple experimentation.

B. Threshold Ratios For Inhibition of Fines Migration Using a Modified Cornstarch Various grades of activated carbon representing a wide distribution of commercially available carbons with varying particle size distributions were mixed in various ratios with an inhibitor derived from a corn-base starch. The particular inhibitor employed was a pH modified epichlorohydrin cross-linked cornstarch having a gross swelling power of about 13 (measured about 45 minutes), a ph of about 6 and a predominant mesh size of about 12 to 100 mesh. The particular cornstarch employed is a commercial product marketed under the name of Textaid and is distributed by the National Starch Corporation. Seven grades of activated carbons were employed in the test. The particle size distribution for the grades tested are shown in Table 1.

This inhibitor, inhibited fines migration for activated carbon with particle size range distributions are represented by grades 1, 2, and 6 at a level of 1:2 starch to carbon. Further, fines migration was inhibited in grades 4 and 5 at a level of 1:1 starch to carbon. Additionally, grades 5 and 3 were inhibited at a starch to carbon ratio of 2:1.

C. Threshold Ratios For Inhibition of Fines Migration Using a Tapioca-based Starch Inhibition of various levels of activated carbons as performed in Section B of this example were repeated in exactly the same manner; this time employing a tapioca-based inhibitor. This particular inhibition was a pregelatinized pH modified epichlorohydrin cross-linked tapioca starch having a gross swelling power of about 16 (measured after 30 minutes), a pH of about 6 and a predominant mesh of about 20 to 100 mesh. The particular inhibitor employed is a starch marketed under the same Instant Textaid by the National Starch Corporation.

TABLE 2

Threshold Ratios For Inhibition of Fines Migration (Corn-based Starch)
Activated Carbon Particle Size Range (Range given in Standard U.S. Sieve Units)

| Weight Ratio Starch/Carbon | >4 mesh 5% <12 mesh 5% | >8 mesh 10% <20 mesh 5% | >12 mesh 5% <20 mesh 5% | >12 mesh 5% <40 mesh 5% | >20 mesh 5% <40 mesh 5% | >20 mesh 10% <50 mesh 3% |
|---|---|---|---|---|---|---|
| 1:6 | No | No | No | No | No | No |
| 1:3 | No | No | No | No | No | No |
| 1:2 | Yes | Yes | No | No | No | Yes |
| 1:1 | Yes | Yes | No | Yes | Yes | Yes |
| 2:1 | Yes | Yes | Yes | Yes | Yes | Yes |

*percent values indicate maximum values
Yes = inhibition of fines migration
No = no significant inhibition of fines migration Table 1

Particle Size Distributions of Various Grades of Carbon

| Grade Number | Upper Limit of Particle Size* | | Lower Limit of Particle Size* | |
|---|---|---|---|---|
| 1 | >4 mesh | 5% | <12 mesh | 5% |
| 2 | >8 mesh | 10% | <20 mesh | 10% |
| 3 | >12 mesh | 5% | <20 mesh | 5% |
| 4 | >12 mesh | 5% | <40 mesh | 5% |
| 5 | >20 mesh | 5% <40 mesh | 5% | |
| 6 | >20 mesh | 10% | <50 mesh | 3% |
| 7 | >14 mesh | 10% <60 mesh | 10% | |

*Percent values indicate maximum values for the given mesh size. For Example, ">4 mesh 5%" indicates that no more than 5 percent of the particles in the distribution will be greater than about 4 mesh. "<12 mesh 5%" indicates that no more than about 5% of the particles in the distribution will be smaller than 12 mesh.

Various weight ratios of starch to carbon were made up for each grade of carbon including 1:6 starch to carbon, 1:3, 1:2, 1:1 and 2:1. Once the completed devices were assembled, the devices were suspended in containers holding approximately 500 cc of tap water. The devices were allowed to stand in the container for a period of up to 24 hours. During the period in which the container was in contact with the water, the system was observed for indications of migration of carbon through the device. No migration of carbon for up to a period of 24 hours was considered to be an indication of inhibiition of fines migration. The results of these various tests are shown in Table 2.

The same seven grades of activated carbon employed in Section B of this example were again employed within the exact same ratios of starch to carbon as set forth in that section. The results of this particular test are shown in Table 3. As can be seen from Table 3, this inhibitor showed a different pattern of inhibition with respect to the activated carbon particles. Grade 3 which could only be inhibited by the cornbased starch at a level of 2:1 starch to carbon as shown previously was inhibited by the tapioca-based starch inhibitor at a level of 1:2 starch to carbon. Grades 1, 2, 3, 4, 5 and 7 were inhibited by this tapioca-based starch at a level of starch to carbon of 1:2. Additionally, grade 6 was inhibited at levels 1:2 starch to carbon.

D. Threshold Ratios for Inhibition of Fines Migration Using Wood Flour

Some of the grades of activated carbon employed in previous sections of this example were again tested using wood flour as the inhibiting agent. The wood flour employed consisted of fine free-flowing very course particles of wood, free from dirt, bark, and other similar foreign matter. Approximately 100 percent of these particles could pass a screen size of about 30 mesh with only about 6 to 10 percent being able to pass through a 100 mesh screen. The particular wood flour employed was a mixture of about 90 percent birch with 10 percent beech wood. Additionally, the wood flour employed in this example was further characterized by having a water content of about 3 to 5 percent as measured by a three-hour evaporation loss of 105° C, maximum acid value of about 1, a pH (in a 2 percent solution in water) of about 5, a diethyl ether extractable residue of no more than about 2.5 percent,

TABLE 3

Threshold Ratios For Inhibition of Fines Migration (Tapioca-based Starch)
Activated Carbon Particle Size Range (Range given in Standard U.S. Units)

| Weight Ratio Starch/Carbon | >4 mesh 5%* <12 mesh 5% | >8 mesh 10% <20 mesh 10% | >12 mesh 5% <20 mesh 5% | >12 mesh 5% <40 mesh 5% | >20 mesh 5% <40 mesh 5% | >20 mesh 10% <50 mesh 3% | >14 mesh 10% <60 mesh 10% |
|---|---|---|---|---|---|---|---|
| 1:6 | No | No | No | No | No | No | No |
| 1:3 | No | No | No | No | No | Yes | No |
| 1:2 | Yes | Yes | Yes | Yes | Yes | Yes | No |
| 1:1 | Yes | Yes | Yes | Yes | Yes | Yes | Yes |
| 2:1 | Yes | Yes | Yes | Yes | Yes | Yes | Yes |

*percent values indicate maximum values
Yes = inhibition of fines migration
No = no significant inhibition of fines migration and an acetone extractable residue of no more than about 4 percent. The particular wood flour used was a grade B610 as distributed by Wilner Woods Products. The wood flours were mixed with various grades of activated carbon in ratios as previously described in the other sections. The results of the immersion tests performed in the like manner are shown in Table 4. As can be seen, grade 2 was successfully inhibited, and this inhibition was obtained at a level of wood flour to carbon of 1:3. Grade 4 was inhibited at a level of 1:1 while grades 1, 3, 5 and 6 were inhibited at a level of 1:1.

It is further understood in the light of the instant specification, that this invention is capable of variation or of modification without departing from the scope thereoof.

TABLE 4

Threshold Ratios For Inhibition of Fines Migration (Wood Flour)
Activated Carbon Particle Size Range (Range given as Standard U.S. Sieve Units)

| Weight Ratio Wood Flour/Carbon | >4 mesh 5%* <12 mesh 5% | >8 mesh 10% <20 mesh 10% | >12 mesh 5% <20 mesh 5% | >12 mesh 5% <40 mesh 5% | >20 mesh 10% <40 mesh 5% | >20 mesh 10% <50 mesh 5% |
|---|---|---|---|---|---|---|
| 1:6 |  | No |  |  |  |  |
| 1:3 | No | Yes | No | No | No | No |
| 1:2 |  | Yes | No | No | No | No |
| 1:1 | No | Yes | No | Yes | No | No |
| 2:1 | Yes | Yes | Yes | Yes | Yes | Yes |

*percent values indicate maximum values
Yes = inhibition of fines migration
No = no significant inhibition of fines migration

What is claimed is:

1. A water purification device comprising:
   (a) a closed container, wherein at least one functional surface of said container is a porous to water nonwoven fabric wherein said fabric has a weight of about 150 to 650 grains/yd$^2$, a porosity of at about 100 cfm/ft$^2$ to about 800 cfm/ft$^2$, a dry machine direction grab tensile strength of at least 3 pounds/linear inch, a dry cross direction grab tensile strength of at least 2 pounds/linear inch, a wet machine direction grab tensile strength of at least 1 pound/linear inch, and a wet cross direction grab tensile strength of at least 0.75 pounds/linear inch;
   (b) an amount, sufficient to treat said water of granular activated carbon contained in said container; and
   (c) an ingredient that will inhibit the migration of fine particles of said carbon through said fabric when said device is immersed in water, wherein said ingredient is compatible to the particle size distribution of said carbon and is dispersed therein, in an amount sufficient to inhibit the migration of fine particles of said carbon through said porous fabric when said device is immersed in water and wherein said ingredient will not normally adversely affect the palatability of said water wherein said ingredient is selected from the group consisting of:
   (a) a pregelatinized, pH modified epichlorohydrin cross-linked tapioca starch having a gross swelling power of about 16 measured after thirty minutes, a pH of about 6, and a predominant mesh size of about 20 to 100 mesh,
   (b) a pH modified, epichlorohydrin cross-linked corn starch having a gross swelling power of about 13 measured after forty-five minutes, a pH of about 6, and a predominant mesh size of about 12 to 100 mesh,
   (c) a substantially pure aluminum lanolate soap in the form of free-flowing particles having a predominant mesh size of about 40 mesh, and
   (d) combinations thereof.

2. A device according to claim 1 wherein said device is a bag wherein said bag has at least one compartment and is substantially constructed from said porous nonwoven fabric.

3. A device according to claim 2 further comprising an appendage extending from said container to facilitate the suspension of said device in, and retrieval of said device from said water.

4. A device according to claim 1 wherein said device is in the form of a teabag wherein said bag contains a volume of about 0.5 to 1.5 cubic inches, wherein said fabric has
   (a) a weight of at least 500 grains/yd$^2$,
   (b) a dry machine direction grab tensile strength of at least about 10 pounds/linear inch,
   (c) a dry cross direction grab tensile strength of at least about 6.5 pounds/linear inch,
   (d) a wet machine direction grab tensile strength of at least about 3 pounds/linear inch, and
   (e) a wet cross direction grab tensile strength of at least about 2 pounds/linear inch.

5. A device according to claim 4 wherein,
   (a) said granular activated carbon has a particle size distribution having no more than about 5 percent of said particles larger than about 4 mesh and no more than about 5 percent of said particles smaller than about 12 mesh,
   (b) said ingredient is a pH modified, epichlorohydrin cross-linked corn starch having a gross swelling power of about 13 measured after forty-five minutes, a pH of about 6, and a predominant mesh size of about 12 to 100 mesh and,
(c) said ingredient is present in a mixture with said carbon in a weight ratio of at least about 1:2 starch to carbon.

6. A device according to claim 4 wherein,
(a) said granular activated carbon has a particle size distribution having no more than about 5 percent of said particles larger than about 8 mesh and no more than about 5 percent of said particles smaller than about 20 mesh,
(b) said ingredient is a pH modified, epichlorohydrin cross-linked corn starch having a gross swelling power of about 13 measured after forty-five minutes, a pH of about 6, and a predominant mesh size of about 12 to 100 mesh, and
(c) said ingredient is present in a mixture with said carbon is a weight ratio of at least about 1:2 starch to carbon.

7. A device according to claim 4 wherein,
(a) said granular activated carbon has a particle size distribution having no more than about 10 percent of said particles larger than about 20 mesh and no more than about 3 percent of said particles smaller than about 50 mesh,
(b) said ingredient is a pH modified, epichlorohydrin cross-linked corn starch having a gross swelling power of about 13 measured after forty-five minutes, a pH of about 6, and a predominant mesh size of about 12 to 100 mesh, and
(c) said ingredient is present in a mixture with said carbon in a weight ratio of at least about 1:2 starch to carbon.

8. A device according to claim 4 wherein,
(a) said granular activated carbon has a particle size distribution having no more than about 10 percent of said particles larger than 20 mesh and no more than about 3 percent of said particles smaller than about 50 mesh,
(b) said ingredient is a pregelatinizied, pH modified, epichlorohydrin cross-linked tapioca starch having a gross swelling power of about 16 measured after thirty minutes, a pH of about 6 and a predominant mesh size of about 20 to 100 mesh, and
(c) said ingredient is present in a mixture with said carbon in a weight ratio of at least 1:3 starch to carbon.

9. A device according to claim 4 wherein,
(a) said granular activated carbon has a particle size distribution having no more than about 5 percent of said particles larger than 4 mesh and no more than 5 percent of said particles smaller than about 12 mesh,
(b) said ingredient is a pregelatinized pH modified, epichlorohydrin cross-linked tapioca starch having a gross swelling of about 16 measured after thirty minutes, a pH of about 6 and a predominant mesh size of about 20 to 100 mesh, and
(c) said ingredient is present in a mixture with said carbon in a weight ratio of at least 1:2 starch to carbon.

10. A device according to claim 4 wherein,
(a) said granular activated carbon has a particle size distribution having no more than about 5 percent of said particles larger than 12 mesh and no more than 5 percent of said particles smaller than about 20 mesh,
(b) said ingredient is a pregelatinized, pH modified, epichlorohydrin cross-linked tapioca starch having a gross swelling power of about 16 measured after thirty minutes, a pH of about 6 and a predominant mesh size of about 20 to 100 mesh, and
(c) said ingredient is present in a mixture with said carbon in a weight ratio of at least 1:2 starch to carbon.

11. A device according to claim 4 wherein,
(a) said granular activated carbon has a particle size distribution having no more than about 5 percent of said particles larger than 12 mesh and no more than 5 percent of said particles smaller than about 40 mesh,
(b) said ingredient is a pregelatinized pH modified, epichlorohydrin cross-linked tapioca starch having a gross swelling of about 16 measured after thirty minutes, a pH of about 6 and a predominant mesh size of about 20 to 100 mesh, and
(c) said ingredient is present in a mixture with said carbon in a weight ratio of at least 1:2 starch to carbon.

12. A device according to claim 4 wherein,
(a) said granular activated carbon has a particle size distribution having no more than about 10 percent of said particles larger than 14 mesh and no more than 10 percent of said particles smaller than about 60 mesh,
(b) said ingredient is a pregelatinized pH modified, epichlorohydrin cross-linked tapioca starch having a gross swelling of about 16 measured after thirty minutes, a pH of about 6 and a predominant mesh size of about 20 to 100 mesh, and
(c) said ingredient is present in a mixture with said carbon in a weight ratio of at least 1:1 starch to carbon.

13. A device according to claim 4 wherein,
(a) said granular activated carbon has a particle size distribution having no more than about 5 percent of said particles larger than 20 mesh and no more than 5 percent of said particles smaller than about 40 mesh,
(b) said ingredient is a pregelatinzied pH modified, epichlorohydrin cross-linked tapioca starch having a gross swelling of about 16 measured after thirty minutes, a pH of about 6 and a predominant mesh size of about 20 to 100 mesh, and
(c) said ingredient is present in a mixture with said carbon in a weight ratio of at least 1:2 starch to carbon.

14. A device according to claim 4 wherein,
(a) said granular activated carbon has a particle size distribution having: i) no more than about 10 percent of said particles larger than 8 mesh and no more than 10 percent of said particles smaller than 20 mesh,
(b) said ingredient is wood flour, and
(c) said ingredient is present in a mixture with said carbon in a weight ratio of at least 1:3 wood flour to carbon.

15. A method of treating drinking water to remove impurities therefrom comprising immersing the device of claim 1 in said water for a period of time sufficient to remove said impurities.

16. A method of treating drinking water to remove impurities therefrom comprising immersing the device of claim 2 in said water for a period of time sufficient to remove said impurities.

17. A method of treating drinking water to remove impurities therefrom comprising immersing the device of claim 7 in said water for a period of time sufficient to remove said impurities.

18. A device for removing certain impurities from water comprising:
(a) a closed container, wherein at least one functional surface of said container is a porous to water nonwoven fabric wherein said fabric has a weight of about 500 grains/yd$^2$ a porosity of at about 100 cfm/ft$^2$ to about 800 cfm/ft$^2$ a dry machine direction grab tensile strength of about 10.6 pounds/linear inch, a dry cross direction grab tensile strength of at least 2 pounds/linear inch, a wet machine direction grab tensile strength of about 3.5 pounds/linear inch, and a wet cross direction grab tensile strength of at least 0.75 pounds/linear inch;
(b) an amount, sufficient to treat said water of an activated carbon contained in said container, wherein said carbon is characterized by a screen size range of about

|  | on 20 mesh | 10 percent |
| --- | --- | --- |
| through 20 mesh | on 30 mesh | 25 to 65 percent |
| through 30 mesh | on 40 mesh | 20 to 40 percent |
| through 40 mesh | on 50 mesh | 5 to 20 percent |
| through 50 mesh |  | 3 percent maximum | a Phenol Number of about 135 mg/g dry carbon, an Iodine Number of about 900 mg/g carbon, and an apparent density of about 0.50 to 0.55 grams per ml; and
(c) a pregelatinized pH modified epichlorohydrin cross-linked tapioca starch having a gross swelling power of about 16 (measured after 30 minutes), a pH of about 6 and a predominant mesh size of about 20 to 100 mesh dispersed therein, in an amount sufficient to inhibit the migration of fine particles of said agent through said porous paper when said device is immersed in water.

19. A method of treating drinking water to remove impurities therefrom comprising immersing the device of claim 17 in said water for a period of time sufficient to remove said impurities.

* * * * *